United States Patent [19]

Funk et al.

[11] 4,313,109
[45] Jan. 26, 1982

[54] INITIALIZATION CONTROL FOR LIGHT BEAM POSITION INDICATOR

[75] Inventors: Buddy K. Funk, Bountiful; David M. Fowler, III, West Jordan, both of Utah

[73] Assignee: Sperry Corporation, New York, N.Y.

[21] Appl. No.: 102,586

[22] Filed: Dec. 11, 1979

[51] Int. Cl.³ .............................................. G08C 21/00
[52] U.S. Cl. ................................. 340/365 P; 178/18; 250/553; 340/712
[58] Field of Search ............ 340/707, 708, 712, 365 P; 178/18; 250/553

[56] References Cited

U.S. PATENT DOCUMENTS

| | | | |
|---|---|---|---|
| 3,579,225 | 5/1971 | Clark | 340/707 |
| 3,860,754 | 1/1975 | Johnson et al. | 340/365 P |
| 4,205,304 | 5/1980 | Moore | 340/365 P |

Primary Examiner—David L. Trafton
Attorney, Agent, or Firm—John P. Dority; William E. Cleaver; Marshall M. Truex

[57] ABSTRACT

A crossed light beam position indicator includes orthogonal arrays of paired light emitters and detectors for covering a display surface with crossed light beams and scanning means coupled to the emitters and detectors for electronically scanning the orthogonal arrays such that a single emitter at any one time is emitting light. Improved initialization means detect the first occurrence of an interrupted light beam and in response to the first detection, reset the scanning means to the initial reset position to thus avoid transmitting an address that might represent only the edge of an object placed in proximity to the display screen and caught by the scan only after the scan had passed the position occupied by the main body of the object.

17 Claims, 8 Drawing Figures

FIG. 1

X DETECTORS      X EMITTERS

INITIALIZATION CONTROL FOR LIGHT BEAM POSITION INDICATOR

BACKGROUND OF THE INVENTION

This invention relates to crossed light beam position indicators having orthogonal coordinate arrays of light sources and detectors for scanning a display surface and more particularly to an improved initialization control for such a system.

Sequentially scanned crossed light beam position indicators are known in the prior art for detecting and transmitting the address of interrupted light beams. These indicators have utilized paired emitters and detectors in X and Y coordinate arrays such that during the time that a single emitter is activated only a single corresponding detector is activated. Examples of such address indicators for display surfaces may be found in U.S. Pat. Nos. 3,860,754; 3,775,560 and 3,764,813. In such prior art apparatus initialization did not insure the transmission of the best address information.

SUMMARY OF THE INVENTION

The improved initialization apparatus in accordance with the present invention avoids the transmission of initial address information which may be subject to inaccuracy because initially only partial information was detected. The scan may have passed the position where part of an object is placed in proximity to a display surface before the object is so placed but, nevertheless, pick up an edge of the object to cause address information to incorrectly reflect the actual position of the center of the object.

The improved initialization apparatus includes means for detecting the first interruption of a light beam by an object placed in proximity to the display surface and means in response to this initial detection for resetting the system to an initial condition for starting a subsequent scan of the display surface. The address information associated with the first interruption of the light beam is not transmitted for use in the system but only address information from the subsequent scan is transmitted.

DETAILED DESCRIPTION OF THE PREFERRED EMBODIMENT

Figure 1:
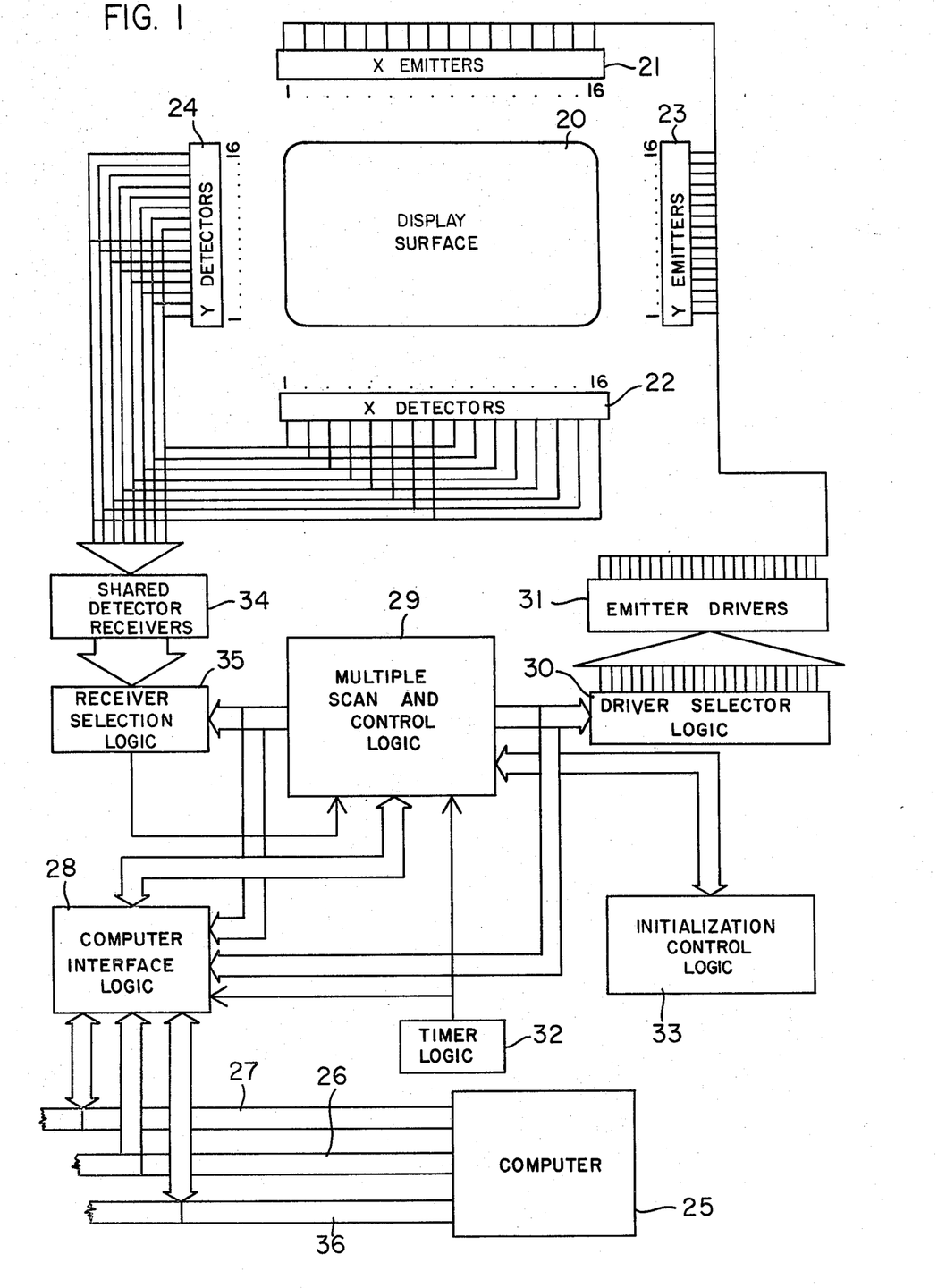
FIG. 1 is a block diagram of a system incorporating the present invention for determining the position of an object placed in proximity to a display surface.

In FIG. 1 there is illustrated a display device 19 having display surface 20. An X array of emitters 21 such as radiation sources in the form of infrared light emitting diodes are mounted along one side of the display surface 20 and are paired with a corresponding X array of light sensors or detectors 22 such as photoconductive transistors mounted on the opposite side of the display surface 20.

Similar Y arrays of paired infrared emitters 23 and detectors 24 are mounted along the other two opposite sides of the display surface as illustrated in FIG. 1. For example, each array 21 and 23 may typically contain 16 emitters and each corresponding array of detectors 22 and 24 will typically contain an equal number of detectors.

The system is shown communicating with a computer 25 by means of computer address bus 26, computer data bus 27 and control bus 36. The communication with the computer 25 is by way of computer interface logic 28. The computer 25 and the buses 26, 27 and 36 are well known in the art and are not further described here, except that computer 25 may, for example, be an 8080 microprocessor manufactured by INTEL Corporation, along with associated standard INTEL support circuits.

Computer interface logic 28 receives commands from the computer 25 over computer data bus 27 and control bus 36 and may also communicate data to the computer 25 over this data bus 27. When it is desired that the system be conditioned to determine the location of an object placed in proximity to display surface 20, a signal is supplied to the computer interface logic by computer 25 and from computer interface logic 28, signals will be supplied to the system in order to cause the display surface to be scanned initially by the X emitters with the X detectors and after initialization by the X and Y emitters in conjunction with the X and Y detectors. Involved in this operation is the multiple scan and control logic 29 which acts upon the driver selector logic 30 to select the emitter drivers 31 which emitter drivers in turn select sequentially the several X emitters 21 and the several Y emitters 23. In order that the entire system is appropriately coordinated, timer logic 32 is provided. Initialization control logic 33 initializes the system upon the detection of the first interruption of a light beam at the display surface after an initial scanning has commenced.

The X and Y detectors are selected under control of the shared detector receivers 34 as determined by the receiver selection logic 35. X detectors 1 through 8 are grouped and wired together with X detectors 9 through 16 and are also grouped and wired together with the corresponding Y detectors as shown. The purpose of this grouping and wiring together is economy of components and is possible since the spread of the light beam from an emitter is not large enough to encompass any two of the detectors connected together.

The operation of the system is such that upon receipt of a command from computer 25, computer interface logic 28 acts on the multiple scan and control logic 29 to initiate the running of the system. X emitters 1 through 16 are sequentially selected and sequentially emit light. As each of the X emitters is selected, certain predetermined X detectors are selected in a predetermined sequence. For example, upon selection of the second X emitter, X detectors 1, 2 and 3 may be sequentially selected such that if any of the light paths emitting from the second X emitter is interrupted before reaching the detectors 1, 2 or 3, the interruption is detected by one or more of the detectors 1, 2 and 3. Shared detector receivers 34 and the receiver selection logic 35 will act upon multiple scan and control logic 29 to bring into play the initialization control logic 33. The initialization control logic 33 resets the scanning mechanism to begin scanning again at the number one X emitter and the corresponding X detectors. After this initialization takes place, the address or addresses at which interruptions take place during the scan of the display surface 20 will be transmitted through the computer interface logic 28 and stored in the computer 25. The addresses here referred to will be the identification of, for example, the X-emitter emitting and the one of the X detectors detecting the absence of the emitted light beam as the scan progresses.

In a similar fashion, the Y emitters are sequentially energized, and corresponding Y detectors are selected to produce the Y coordinate address or addresses. The Y coordinate address or addresses are likewise transmitted through the computer interface logic 28. The computer interface logic communicates these addresses to computer 25 where computer 25 under an appropriate program may combine or process them to form as may be desired an indication of the location of the object placed in proximity to display surface 20 to interrupt the crossed light beams. For example, the object placed in proximity to the display surface 20 may be the finger of a student pointing to a multiple choice answer to a question appearing on the display surface.

In this way, a finer definition may be obtained in that for each emitter energized, plural light paths, for example, three light paths, are detectable by the X detectors without providing additional detectors or emitters.

Figure 2:
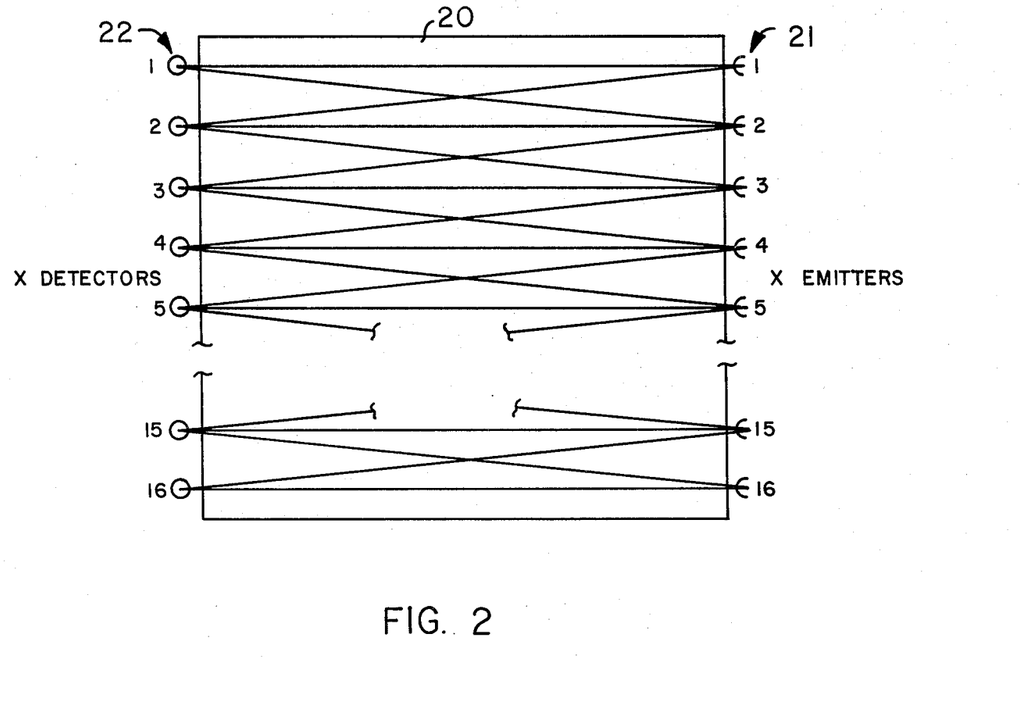
FIG. 2 is a representation of the pattern of some of the light paths across the display surface.
Figure 3:
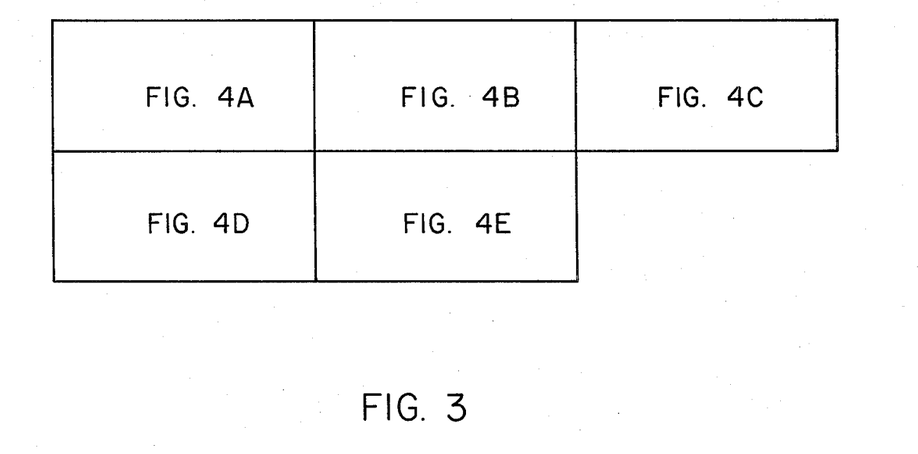
FIG. 3 shows how FIGS. 4A through 4E fit together.

Referring to FIG. 2, the display surface 20 shown in FIG. 1 is shown enlarged and partially broken away. The enlargement in the vertical direction is greater than the enlargement in the horizontal direction. Also indicated is the X emitter array 21 and the X detector array 22. It may be seen how an emitter with an emitted light beam having a spread of, for example, about 15 degrees may illuminate plural detectors. In the example of FIG. 2, each emitter is shown illuminating three detectors, except at the edge of the display surface. The emitter illuminates its corresponding detector appearing directly opposite across the display surface and the detectors immediately on each side of this corresponding detector. One thus sees that in this arrangement there are three light paths between each emitter and the plural detectors on the opposite side of the display surface, except on the edges where only two detectors are illuminated. The resolution obtainable is greater when use is made of the several light paths than when use is made of only a single path between an emitter and a corresponding detector.

Figure 4A:
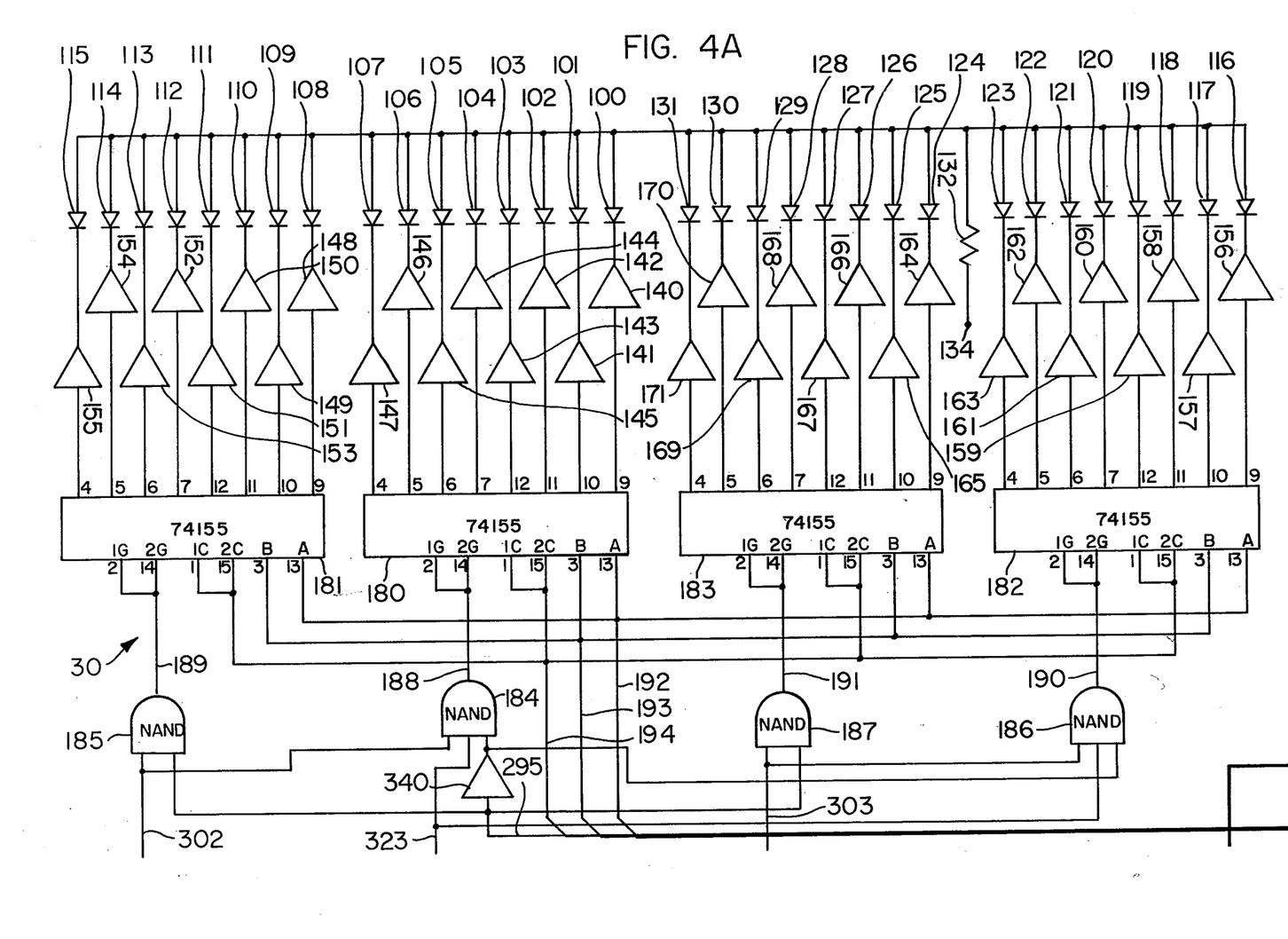
FIGS. 4A through 4E together are a schematic diagram of a system incorporating the improved initialization apparatus of the present invention.

Referring now more particularly to FIGS. 4A through 4E, the crossed light beam position indicator is shown in greater detail. Referring first to FIG. 4A, there is shown an array of X coordinate light emitting diodes and an array of Y coordinate light emitting diodes. The X coordinate light emitting diodes are respectively referenced 100 through 115, and the Y coordinate light emitting diodes are respectively referenced 116 through 131. These light emitting diodes may, for example, be standard light emitting diodes such as those supplied by Texas Instruments Company and designated TIL 31. The light emitting diodes 100 through 131 have their anodes commoned together and by line 133 are connected to resistor 132 which is in turn connected to a source of positive potential. The resistor 132 may, for example, be of 40 ohms and of a two-watt capacity, and the positive potential to which resistor 132 is connected may be, for example, +12 volts at terminal 134. The array of emitter drivers 31 is shown as made up of an X coordinate array of drivers 140 through 155 and a Y coordinate array of emitter drivers 156 through 171. Emitter drivers 140 through 171 may be standard amplifiers of the type designated 75451 and supplied by the Texas Instruments Company. Emitter drivers 140 through 171 are respectively connected to the cathodes of light emitting diodes 100 through 131. The operation of these arrays of light emitting diodes and emitter drivers is such that emitter drivers 140 through 171 are sequentially activated to drive in sequence their respective light emitting diodes. The structure for controlling the emitter drivers 140 through 171 is shown as an array of four demultiplexers designated respectively 180 through 183. Demultiplexers 180 through 183 are the standard T-squared L (or TTL) multiplexer industry-wide standard and may be, for example, of the type designated 74155 and available from the Texas Instruments Company. These demultiplexers 180 through 183 each serve the function of taking three input lines having coded information appearing thereon and converting the coded information on the three input lines to a signal on a single one of eight output lines. The pin designations and the pin connections to demultiplexers 180 through 183 are as shown in FIG. 4A. Demultiplexers 180 through 183 are sequentially brought into play by low voltage signals respectively from NAND circuits 184 through 187 over lines 188 through 191 respectively. NAND circuits 184 through 187 may be of standard types such as 7400 and 7410 supplied by the Texas Instruments Company. The 7400 has two inputs, while the 7410 has three inputs. The operation of NAND circuits 184 through 187 is such that these NAND circuits sequentially supply signals to demultiplexers 180 through 183 respectively to sequentially activate demultiplexers 180 through 183. These NAND circuits require a high voltage on all their inputs in order to supply a low voltage on their outputs. Demultiplexers 180 through 183 have supplied to their inputs coded information appearing on a set of three lines designated 192, 193 and 194. The particular demultiplexer activated by its associated NAND circuits 184 through 187 will, in response to the coded infomation appearing on the set of three lines 192 through 194, generate a signal on the appropriate one of its eight output lines. The demultiplexers 180 through 183, the NAND circuits 184 through 187 and the associated connections in general make up the driver selector logic 30 previously referred to in FIG. 1. The coded information appearing on lines 192 through 194 and the controls for NAND circuits 184 through 187 are supplied by the multiple scan and control logic indicated generally at 29 in FIG. 1. This multiple scan and control logic is shown in greater detail in FIGS. 4B and 4E and will be further described later in the specification.

In operation the light emitting diodes 100 through 131, FIG. 4A, which respectively correspond to X emitters 1 through 16 and Y emitters 1 through 16 as seen in FIG. 1 are sequentially energized to sequentially emit a fan-shaped pattern of light typically about 10 degrees in width. The oppositely-located detectors may detect light from the emitters associated therewith in the absence of an object adjacent the display surface to block the light. The circuit arrangement of the X and Y coordinate detectors is shown in greater detail in FIG. 4D. Referring more specifically to FIG. 4D, there is shown the arrangement of the X and Y coordinate arrays of detectors, the arrangement of the shared detector receivers and the arrangement of the receiver selection logic. Each emitter in the X and Y coordinate arrays previously described faces on the opposite side of the display surface a corresponding X or Y coordinate detector. There is thus typically one detector for each emitter. In order to save circuit components the detectors are grouped together such that several detectors may share a single receiver amplifier and so that the receiver selection logic may be simplified. The detectors may, for example, be light sensitive transistors of the type designated TIL 81 and available from Texas Instruments Company. Since the light pattern emitted from each emitter is typically about 10 degrees in width, the detectors may be grouped together such that, for example, one half of the X array of detectors may be grouped with the other half of the X array of detectors and likewise for the Y coordinate array of detectors. Since only an X emitter or a Y emitter will be energized at one time, the corresponding X and Y detectors may also be grouped together. This arrangement is shown in FIG. 4D where eight groups of detectors indicated at 200 through 207 are shown. Since the circuit arrangement of the detectors in each of the groups 200 through 207 is the same, only the details of the circuit arrangement of the detectors in group 200 is shown. The group of detectors in the group 200 are respectively 210 through 213 where each of the transistor detectors has its transistor emitter connected to a common line 214 along with the transistor emitters from each of the detectors in the other groups 201 through 207. Common line 214 is taken to a positive potential, for example, +5 volts DC at terminal 215. The collectors of each of the detectors 210 through 213 are commoned together to line 216, which line 216 is coupled to a voltage comparator 217 through a resistor network referred to generally as 225. The groups of detectors 201 through 207 are respectively connected to voltage comparators 217 through 224 as shown in FIG. 4D. Voltage comparators 217 through 224 may each be, for example, of the LM 339 type available from the National Semiconductor Company. The details of the connection of the detectors in each of the groups 201 through 207 and the details of the connections of these groups to their respective comparators 217 through 224 is the same as the details shown for the group of detectors 200 and the comparator 217. The outputs from comparators 217 through 224 are fed to a multiplexer 226 over lines 227 through 234. Multiplexer 226 may, for example, be a standard Texas Instruments part designated as the 74151. A second input is provided to the multiplexer 226 from the multiple scan and control logic (indicated in block form at 29 in FIG. 1). This input is in the form of three lines 235, 236 and 237, which three lines will have coded information appearing thereon. The operation of the multiplexer is such that when an object is placed on the display surface to block the light from an emitter to a receiving detector, the receiver or comparator connected to that particular detector will detect a dark condition and its output will go to the low condition. The information contained on lines 235, 236 and 237 causes the low condition on that particular detector to be transferred through the multiplexer 226 as a signal indicating dark at its output pin number 5 over line 238. This output from multiplexer 226 at a time in coincidence with the information on lines 235 through 237 will give an indication of the particular detector being scanned and having light blocked therefrom by an object at the display surface.

Figure 4B:
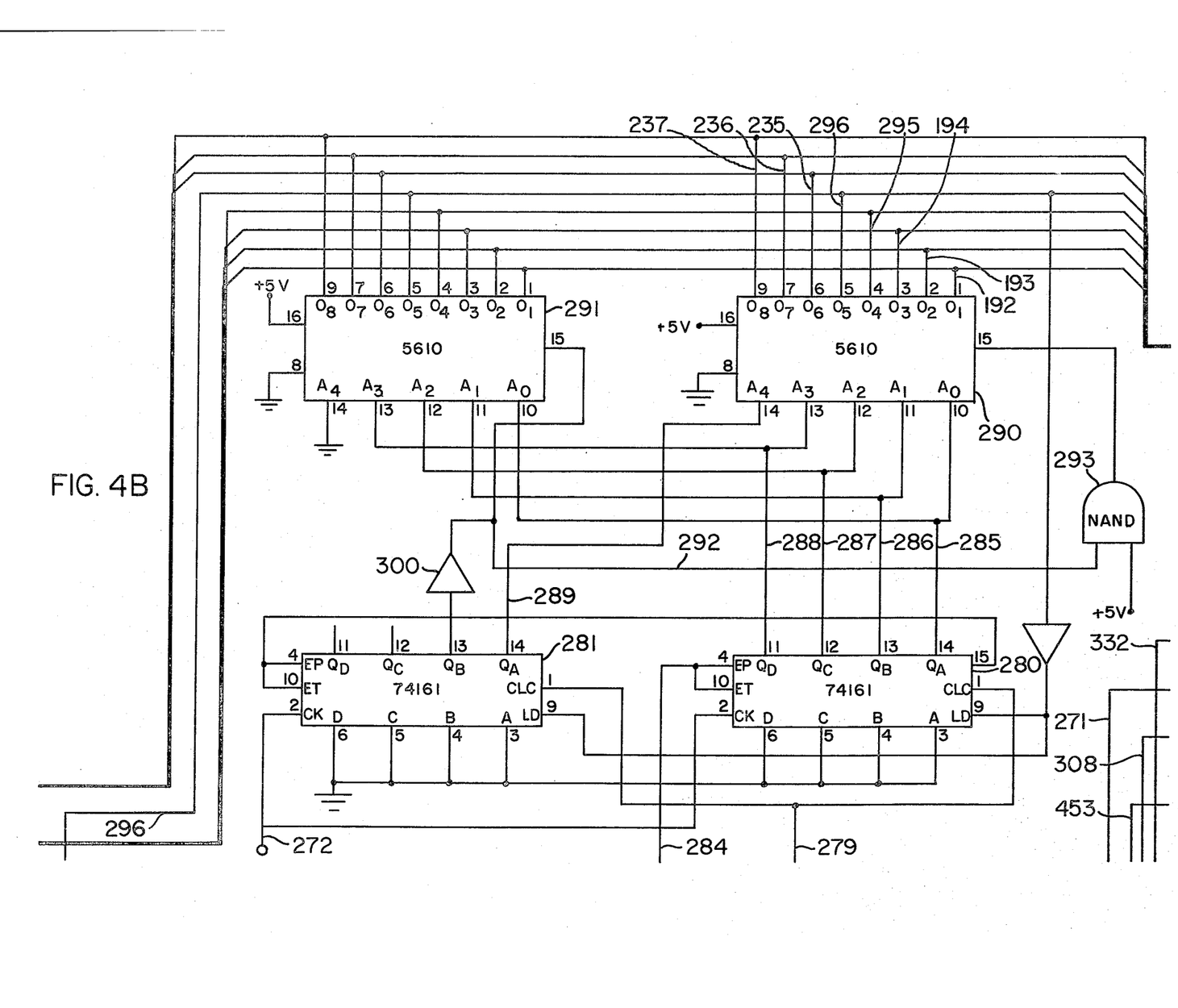
Figure 4C:
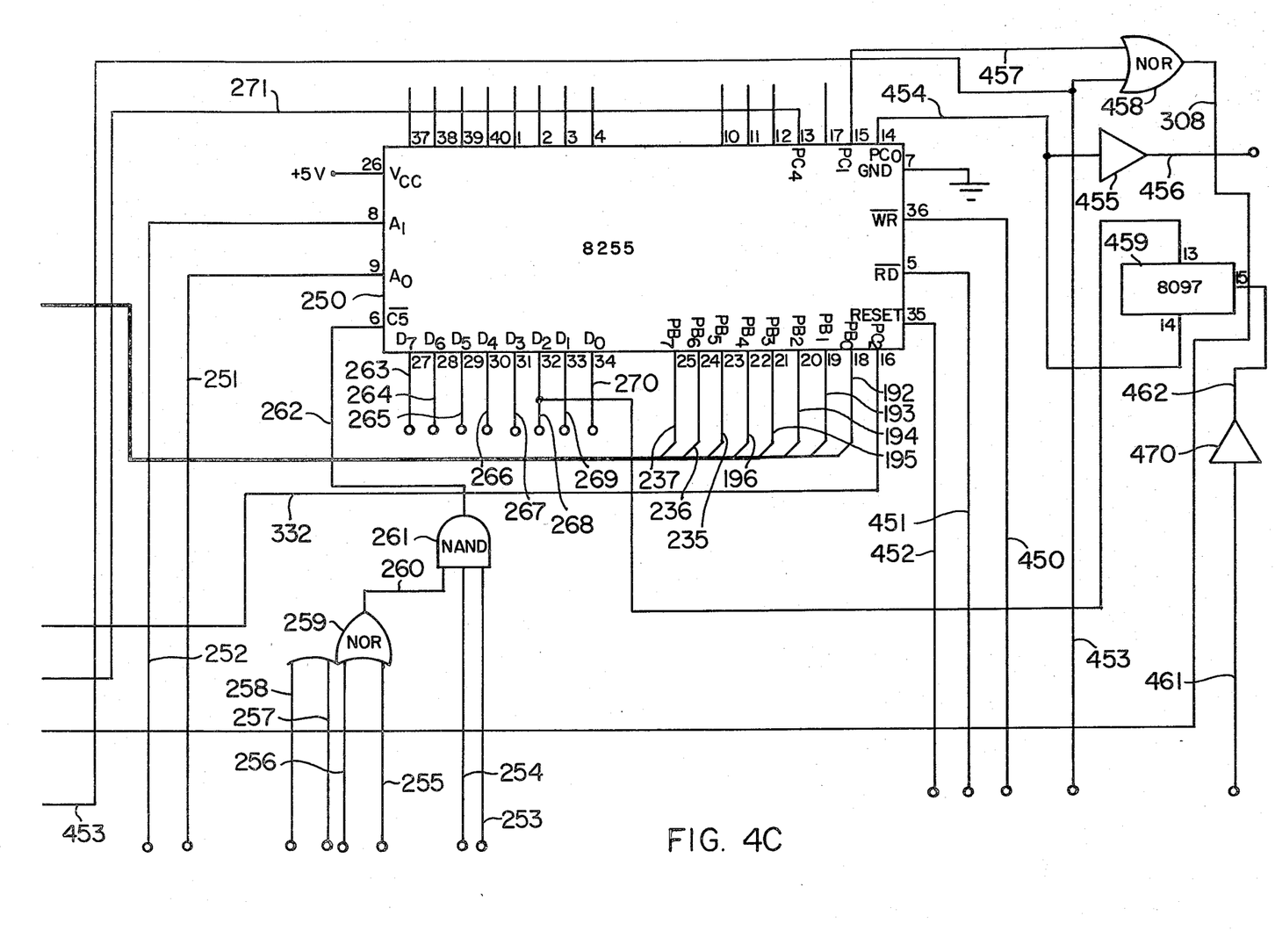
Figure 4D:
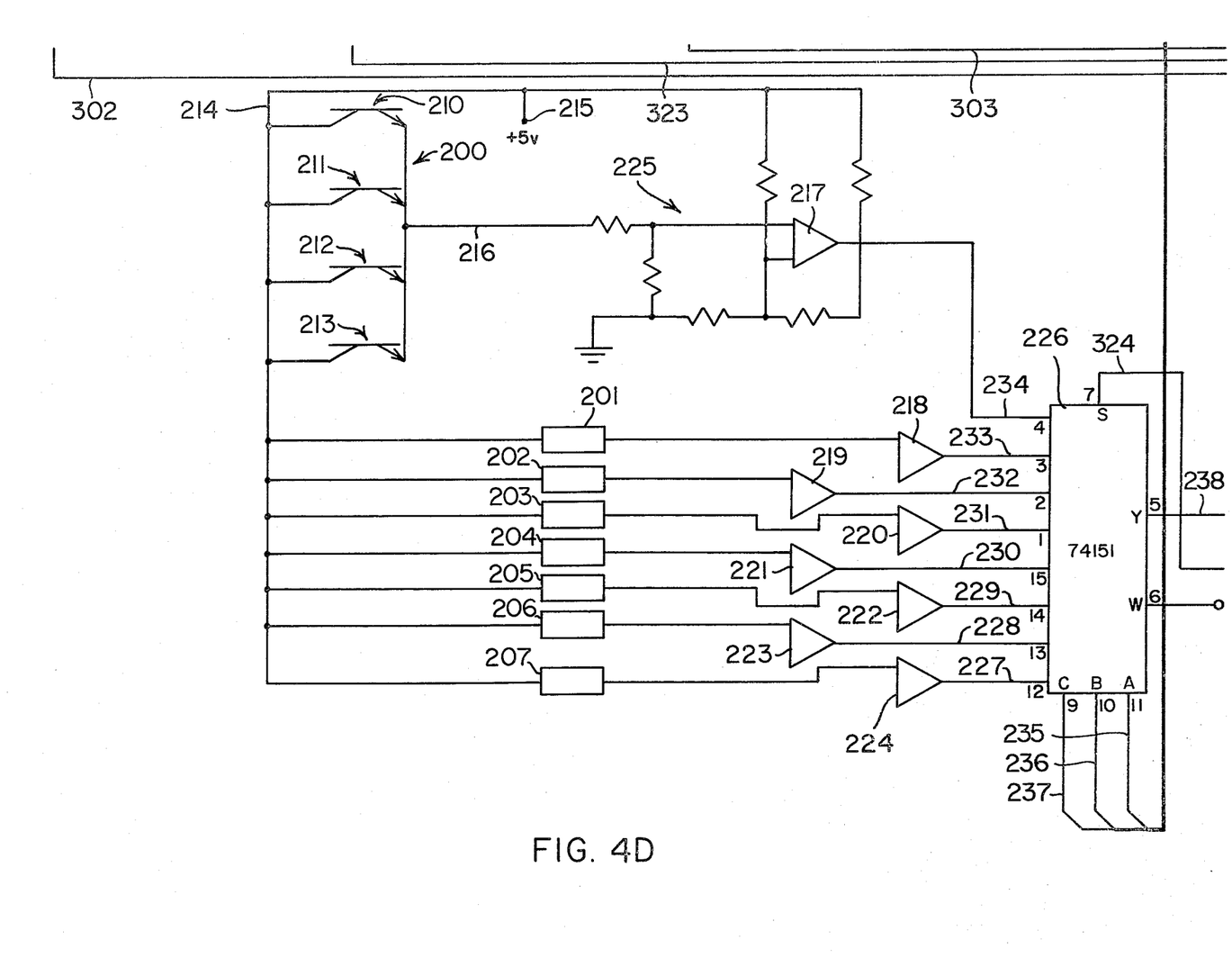
Figure 4E:
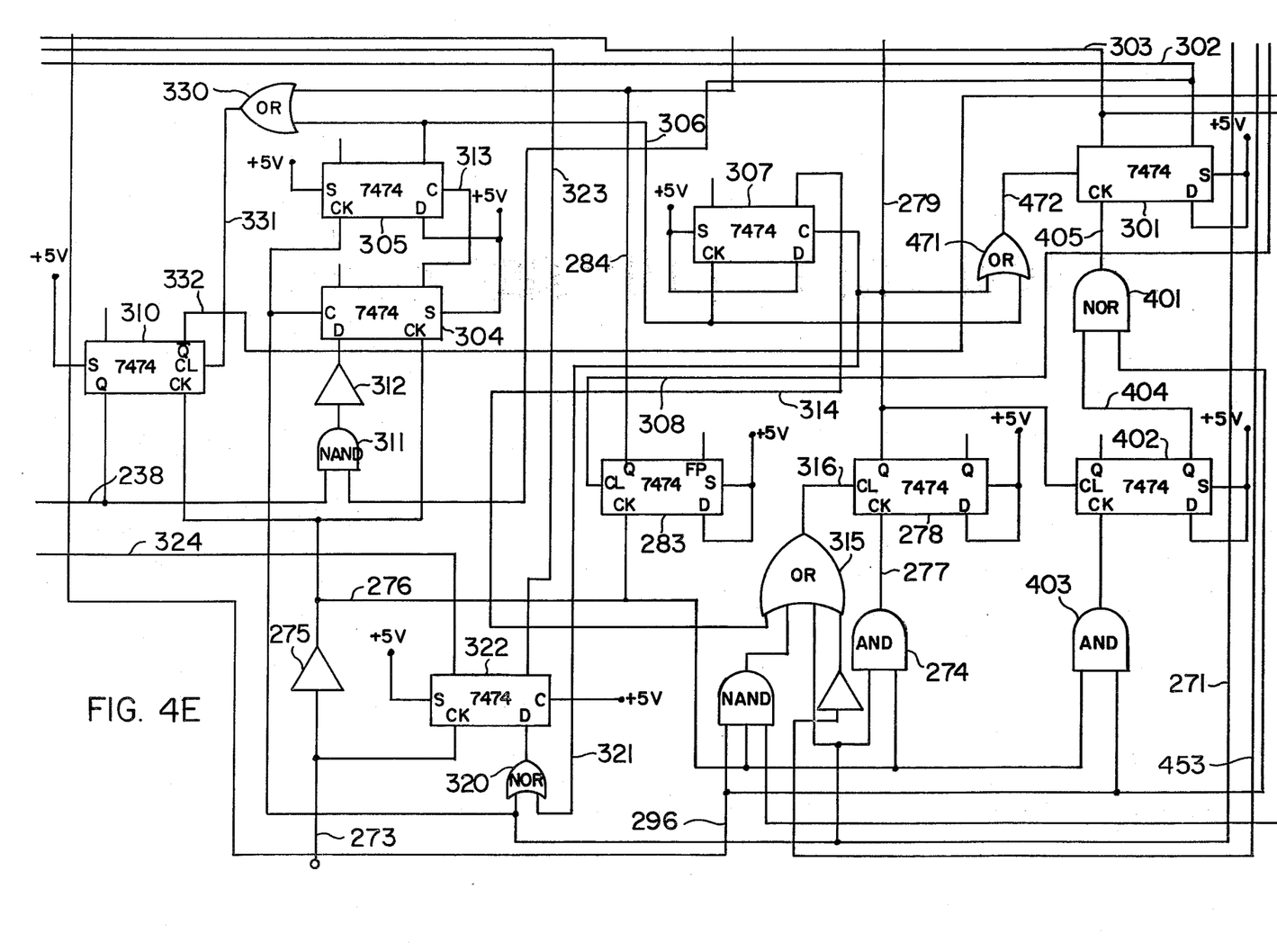

The multiple scan and control logic indicated at 29 in FIG. 1 and the initialization control logic indicated at 33 in FIG. 1 is shown in more detail generally in FIGS. 4B and 4E. The purpose of the initialization control logic is to insure that an object placed adjacent the display surface is in its intended position before scanning takes place to generate information indicating the object's position for transmittal to and through the computer interface logic to the computer 25. The purpose of the multiple scan and control logic is to coordinate the energization of the emitters and the reading of the detectors in order that the plural paths of light between a single emitter and plural oppositely located detectors may be effectively utilized in identifying the location of an object adjacent a display surface.

Operation of the present system is initiated by commands from computer 25 shown in FIG. 1 transmitted over data, address and control buses 27, 26 and 36 respectively to the computer interface logic 28 shown in FIG. 1 and shown in more detail in FIG. 4C.

The largest portion of the computer interface logic is a standard interface part of the 8255 type and particularly suited for use with the 8080 microprocessor, available from the INTEL Corporation. The 8255 interface part is designated at 250 in FIG. 4C and is a three-port device of which only two ports and the interrupt circuitry are used. Interface part 250 has an automatic storage ability such that when a strobe or low signal is applied to pin 16, the PC 2 terminal of the 8255 device, information appearing at pins 18 through 25 is stored in the 8255 device. The 8255 is capable of operating in different configurations, and the manufacturer of the 8255 provides standard programming to cause the 8255 to operate in a number of different standard configurations. The standard configuration in which the 8255 is employed in the present application is the configuration designated as Mode 1 by the manufacturer, INTEL Corporation. Mode 1 is selected by the computer 25 setting the lines 251 through 258 to the following states:

| Address Bus Lines | | | | | | | |
|---|---|---|---|---|---|---|---|
| 258 | 257 | 256 | 255 | 254 | 253 | 252 | 251 |
| 0 | 1 | 0 | 1 | 0 | 0 | 1 | 1 |
| Control Bus Lines | | | | | | | |
| 452 | 451 | 450 | | | | | |
| 0 | 1 | 0 | | | | | |
| Data Bus Lines | | | | | | | |
| 263 | 264 | 265 | 266 | 267 | 268 | 269 | 270 |
| 1 | 0 | 0 | 0 | 0 | 1 | 1 | X | where:
X indicates either a high or low level,
0 indicates the low level and
1 indicates the high level.

Address bus 26 and control bus 36 are set to the listed state to put the 8255 (250) into control mode and data bus 27 is set to the listed state to select Mode 1 for lines 192 through 196 and 235, 236 and 237 of the 8255. As soon as the strobe appears on pin 16 at this particular port of the 8255 device, the 8255 device accepts the 8-bit data word from pins 18 through 25 and generates an interrupt into the computer (indicated at 25 on FIG. 1), and the computer 25 will then read the information stored in the 8255. This is accomplished in the following manner. The lines 454 from output PC 0 and 457 from output PC 1 of the 8255 circuit will both be set high as soon as the strobe signal appears on line 332. Line 457 is presented to one input of a NOR circuit 458. This NOR circuit is of the type 7402 and may be, for example, obtained from the Texas Instruments Company. When the input line 457 goes high the output of the NOR circuit 458 on line 308 will go low and cause the flip-flop 283 to be reset and held reset until the signal on line 457 goes low. Thus, after receipt of a strobe signal on line 332 no further counting will take place until the PC 1 signal appearing on line 457 is reset. The high generated on line 454 is presented to the input of an inverter 455 and the input of a bus driver circuit 459. This bus driver may be, for example, an 8097, available from the National Semiconductor Company. The output of the inverter, line 456, is the interrupt line of the control bus 36 to the computer 25. The computer determines which device is interrupting by setting the signal on line 461 of the control bus high. This high signal on line 461 is inverted at inverter 470 and is fed over line 462 to enable bus driver 459. This enable on line 462 causes the signal from the 8255 circuit PC 0 to be transferred through the bus driver 459 onto the data bus on line 268 (DB 2). Thus the computer 25 can read the data bus 27. Note that line 268 (DB 2) is in a modified state and determines the interrupt to computer 25 is coming from the present system. The computer 25 then addresses the 8255, using address bus 26 and control bus 36 and transfers the data latched in the 8255 to the computer on data bus 27. As the read takes place the interrupt signal generated by the strobe on line 457 is cleared or reset (PC 0 and PC 1 are both set low) so that the 8255 is ready for the next information that may be transmitted to it on pins 18 through 25 (lines 192 through 196 and 235 through 237).

Prior to operating the apparatus in the manner just described, the computer interface logic is addressed by the computer 25 in order that the computer interface logic 28 and the various other components making up the present crossed light beam position indicator may be brought into operation. Interface logic 28 is addressed by the computer over the computer address bus 26 as indicated in FIG. 1 and is shown in more detail in FIG. 4C as including lines 251 through 258. The information from the computer on lines 255, 256, 257 and 258 is fed to the NOR circuit 259. This NOR circuit may, for example, be a 7425, available from the Texas Instruments Company. Output line 260 of the NOR circuit will go high when all input lines 255 through 258 are low. When this high output 260, and high levels on lines 253 and 254 are fed to the NAND circuit 261, the output line 262 will go low. The NAND circuit may be of the type 7410, available from the Texas Instruments Company. The function of NOR circuit 259 and NAND circuit 261 are simply to monitor the computer address bus 26 and, when the enabling address appears thereon, send a signal on line 262 out from the NAND circuit 261 to indicate that it is this particular 8255 device and its associated circuitry that is being selected by the computer for further operation. In particular, the selection is made to allow the 8255 device to receive on lines 27 through 34 the information appearing on the data bus 27 from the computer. The signal selecting the interface part 250 is taken on line 262 from NAND circuit 261 to pin 6 of the interface part 250. When the low signal on line 262 appears at pin 6 of the 8255 device, and the computer control bus 36 and computer data bus 27 are set to the following states, a high level will appear on pin number 13 labeled PC 4 on the 8255.

| Control Bus Lines | | |
|---|---|---|
| 452 | 451 | 450 |
| 0 | 1 | 0 |
| Data Bus Lines | | |

| 263 | 264 | 265 | 266 | 267 | 268 | 269 | 270 |
|---|---|---|---|---|---|---|---|
| 0 | X | X | X | 1 | 1 | 0 | 1 |

The signal on pin number 13 is the run signal on line 271 and can be set or reset by setting all bus lines as listed above, except for line 270. When line 270 is set to carry a 1 or high by computer 25, the run line 271 is set. When line 270 is set to a 0 or low, the run line is reset. A number of the pins of the 8255 device are not used in its present application. These unused pins are pins 1, 2, 3, 4, 10, 11, 12, 17 and 37 through 40. The computer data bus includes lines 263 through 270.

Operation is initiated by the output from the interface part 250 appearing on line 271 as a high signal. This high signal in conjunction with clock pulses starts the operation. Clock pulses from a source 32 (FIG. 1), not shown in detail, are supplied on line 272 of FIG. 4B and on line 273 of FIG. 4E. These clock pulses are generated in any well-known manner and may derive their timing from a standard timer such as a type NE 555 supplied by the Signetics Corporation and preferably for the present application have a low duration, for example, of approximately 0.2 milliseconds and a high duration of approximately 1.4 milliseconds. These pulses are constantly appearing on lines 272 and 273 for operation of the present system. A first operation to be performed in the present crossed light beam position indicator is to initialize the system such that information fed to and through the interface part 250, previously discussed, will be reliable information. Referring now more specifically to FIG. 4E, the signal appearing on the line 271 from the 250 interface part is fed to AND circuit 274 along with the inverted clock signal from line 273. The clock signal is inverted at inverter 275 and over line 276 is applied to the other side of AND circuit 274 such that when coincidence occurs between the high signal on line 271 and the high signal on line 276, a signal is fed over line 277 to the clock input of a flip-flop 278. Flip-flop device 278 may, for example, be one half of a standard D-type TTL flip-flop circuit designated the 7474 and supplied by the Texas Instruments Company. The pin connections for this flip-flop 278 are as shown. The output from AND circuit 274 thus sets the flip-flop 278 to the on condition, and as a result a high signal appears on its output pin number 5 and consequently on line 279. The high signal on line 279 is fed to counters 280 and 281 on FIG. 4B. Counters 280 and 281 may, for example, be standard counters of the 74161 type available from Texas Instruments Company. When flip-flop 278 is in the off or reset condition, the signal on line 279 is low which is applied to the clear input of counters 280 and 281 to inhibit the counters operating. When, however, the signal on line 279 goes high the clear input to the counters 280 and 281 is removed; and the counters will count up under the influence of the clock pulses appearing on line 272. As shown pins A, B, C and D of each of the counters 280 and 281 are grounded while line 282 connects pin number 15 of counter 280 to pins 7 and 10 of counter 281 in order that counters 280 and 281 will not operate simultaneously but will rather operate in sequence as a single counter. In order that the counters may start operating, it is necessary that a high signal appear on line 284 going to pins 7 and 10 of counter 280. The high signal on line 284 comes from a flip-flop 283 (FIG. 4E) and the conditions causing the signal from flip-flop 283, pin 9 to be high will be discussed in greater detail later. As counters 280 and 281 count up, the addresses from these counters appearing on lines 285 through 289 are applied to read-only memory devices 290 and 291 as indicated. Read-only-memory (ROM) devices 290 and 291 may each be a standard part of the IM 5610 type available from Intersil Incorporated. The output from pin 13 of counter 281 is taken through an inverter and applied to the CE input at pin 15 of ROM 291 and also through line 292 to one side of a NAND circuit 293 being used as an inverter. The other input of the NAND circuit 293 is connected to a positive potential such as +5 volts as shown. Thus either a signal will be applied to ROM 290 or to ROM 291 at their respective pins 15 in order that only one of the ROMs 290 or 291 will be selected, such selection depending on the state of counters 280 and 281. More specifically, a high output from pin 13 of counter 281 is applied through inverter 300 as a low signal to ROM 291 and one of the inputs of NAND circuit 293 to cause the output of NAND circuit 293 to be high and thus a high input to pin 15 of ROM 290. With a low output from pin 13 of counter 281 the opposite conditions will respectively prevail at pins 15 of ROMs 290 and 291. The outputs from ROMs 290 and 291 are taken from the outputs designated 01 through 08 on each of the ROMs. These outputs 01 through 08 are pins 1 through 9 respectively and the outputs of the two ROMs are connected together as shown where lines 192 through 194, 295, 296, 237 and 235 respectively carry the signals appearing on outputs 01 through 08 of each of the ROMs 290 and 291. The internal structure and information content of the standard ROMs 290 and 291 is better set forth in tabular form. The following ROM truth tables give this information.

| ROM TRUTH TABLE ROM #290 | | | | | | | | | | |
|---|---|---|---|---|---|---|---|---|---|---|
| SENSOR | ADDRESS | EMIT | $O_8$ | $O_7$ | $O_6$ | $O_5$ | $O_4$ | $O_3$ | $O_2$ | $O_1$ |
| 1-9 | 0 0 0 0 0 | 1 | 0 | 0 | 0 | 0 | 0 | 0 | 0 | 0 |
| 1-9 | 0 0 0 0 1 | 1 | 0 | 0 | 0 | 0 | 0 | 0 | 0 | 0 |
| 2-10 | 0 0 0 1 0 | 1 | 0 | 0 | 1 | 0 | 0 | 0 | 0 | 0 |
| 1-9 | 0 0 0 1 1 | 2 | 0 | 0 | 0 | 0 | 0 | 0 | 0 | 1 |
| 2-10 | 0 0 1 0 0 | 2 | 0 | 0 | 1 | 0 | 0 | 0 | 0 | 1 |
| 3-11 | 0 0 1 0 1 | 2 | 0 | 1 | 0 | 0 | 0 | 0 | 0 | 1 |
| 2-10 | 0 0 1 1 0 | 3 | 0 | 0 | 1 | 0 | 0 | 0 | 1 | 0 |
| 3-11 | 0 0 1 1 1 | 3 | 0 | 1 | 0 | 0 | 0 | 0 | 1 | 0 |
| 4-12 | 0 1 0 0 0 | 3 | 0 | 1 | 1 | 0 | 0 | 0 | 1 | 0 |
| 3-11 | 0 1 0 0 1 | 4 | 0 | 1 | 0 | 0 | 0 | 0 | 1 | 1 |
| 4-12 | 0 1 0 1 0 | 4 | 0 | 1 | 1 | 0 | 0 | 0 | 1 | 1 |
| 5-13 | 0 1 0 1 1 | 4 | 1 | 0 | 0 | 0 | 0 | 0 | 1 | 1 |
| 4-12 | 0 1 1 0 0 | 5 | 0 | 1 | 1 | 0 | 0 | 1 | 0 | 0 |
| 5-13 | 0 1 1 0 1 | 5 | 1 | 0 | 0 | 0 | 0 | 1 | 0 | 0 |
| 6-14 | 0 1 1 1 0 | 5 | 1 | 0 | 1 | 0 | 0 | 1 | 0 | 0 |
| 5-13 | 0 1 1 1 1 | 6 | 1 | 0 | 0 | 0 | 0 | 1 | 0 | 1 |
| 6-14 | 1 0 0 0 0 | 6 | 1 | 0 | 1 | 0 | 0 | 1 | 0 | 1 |
| 7-15 | 1 0 0 0 1 | 6 | 1 | 1 | 0 | 0 | 0 | 1 | 0 | 1 |
| 6-14 | 1 0 0 1 0 | 7 | 1 | 0 | 1 | 0 | 0 | 1 | 1 | 0 |
| 7-15 | 1 0 0 1 1 | 7 | 1 | 1 | 0 | 0 | 0 | 1 | 1 | 0 |
| 8-16 | 1 0 1 0 0 | 7 | 1 | 1 | 1 | 0 | 0 | 1 | 1 | 0 |
| 7-15 | 1 0 1 0 1 | 8 | 1 | 1 | 0 | 0 | 0 | 1 | 1 | 1 |
| 8-16 | 1 0 1 1 0 | 8 | 1 | 1 | 1 | 0 | 0 | 1 | 1 | 1 |
| 1-9 | 1 0 1 1 1 | 8 | 0 | 0 | 0 | 0 | 0 | 1 | 1 | 1 |
| 8-16 | 1 1 0 0 0 | 9 | 1 | 1 | 1 | 0 | 1 | 0 | 0 | 0 |
| 1-9 | 1 1 0 0 1 | 9 | 0 | 0 | 0 | 0 | 1 | 0 | 0 | 0 |
| 2-10 | 1 1 0 1 0 | 9 | 0 | 0 | 1 | 0 | 1 | 0 | 0 | 0 |
| 1-9 | 1 1 0 1 1 | 10 | 0 | 0 | 0 | 0 | 1 | 0 | 0 | 1 |
| 2-10 | 1 1 1 0 0 | 10 | 0 | 0 | 1 | 0 | 1 | 0 | 0 | 1 |
| 3-11 | 1 1 1 0 1 | 10 | 0 | 1 | 0 | 0 | 1 | 0 | 0 | 1 |
| 2-10 | 1 1 1 1 0 | 11 | 0 | 0 | 1 | 0 | 1 | 0 | 1 | 0 |
| 3-11 | 1 1 1 1 1 | 11 | 0 | 1 | 0 | 0 | 1 | 0 | 1 | 0 |

| ROM TRUTH TABLE ROM #291 | | | | | | | | | | |
|---|---|---|---|---|---|---|---|---|---|---|
| SENSOR | ADDRESS | EMIT | $O_8$ | $O_7$ | $O_6$ | $O_5$ | $O_4$ | $O_3$ | $O_2$ | $O_1$ |
| 4-12 | 0 0 0 0 0 | 11 | 0 | 1 | 1 | 0 | 1 | 0 | 1 | 0 |
| 3-11 | 0 0 0 0 1 | 12 | 0 | 1 | 0 | 0 | 1 | 0 | 1 | 1 |
| 4-12 | 0 0 0 1 0 | 12 | 0 | 1 | 1 | 0 | 1 | 0 | 1 | 1 |
| 5-13 | 0 0 0 1 1 | 12 | 1 | 0 | 0 | 0 | 1 | 0 | 1 | 1 |
| 4-12 | 0 0 1 0 0 | 13 | 0 | 1 | 1 | 0 | 1 | 1 | 0 | 0 |
| 5-13 | 0 0 1 0 1 | 13 | 1 | 0 | 0 | 0 | 1 | 1 | 0 | 0 |
| 6-14 | 0 0 1 1 0 | 13 | 1 | 0 | 1 | 0 | 1 | 1 | 0 | 0 |
| 5-13 | 0 0 1 1 1 | 14 | 1 | 0 | 0 | 0 | 1 | 1 | 0 | 1 |
| 6-14 | 0 1 0 0 0 | 14 | 1 | 0 | 1 | 0 | 1 | 1 | 0 | 1 |
| 7-15 | 0 1 0 0 1 | 14 | 1 | 1 | 0 | 0 | 1 | 1 | 0 | 1 |
| 6-14 | 0 1 0 1 0 | 15 | 1 | 0 | 1 | 0 | 1 | 1 | 1 | 0 |
| 7-15 | 0 1 0 1 1 | 15 | 1 | 1 | 0 | 0 | 1 | 1 | 1 | 0 |
| 8-16 | 0 1 1 0 0 | 15 | 1 | 1 | 1 | 0 | 1 | 1 | 1 | 0 |
| 7-15 | 0 1 1 0 1 | 16 | 1 | 1 | 0 | 0 | 1 | 1 | 1 | 1 |
| 8-16 | 0 1 1 1 0 | 16 | 1 | 1 | 1 | 0 | 1 | 1 | 1 | 1 |
| 8-16 | 0 1 1 1 1 | 16 | 1 | 1 | 1 | 1 | 1 | 1 | 1 | 1 |
| — | 1 0 0 0 0 | — | 0 | 0 | 0 | 1 | 0 | 0 | 0 | 0 |
| — | 1 0 0 0 1 | — | 0 | 0 | 0 | 1 | 0 | 0 | 0 | 0 |
| — | 1 0 0 1 0 | — | 0 | 0 | 0 | 1 | 0 | 0 | 0 | 0 |
| — | 1 0 0 1 1 | — | 0 | 0 | 0 | 1 | 0 | 0 | 0 | 0 |
| — | 1 0 1 0 0 | — | 0 | 0 | 0 | 1 | 0 | 0 | 0 | 0 |
| — | 1 0 1 0 1 | — | 0 | 0 | 0 | 1 | 0 | 0 | 0 | 0 |
| — | 1 0 1 1 0 | — | 0 | 0 | 0 | 1 | 0 | 0 | 0 | 0 |
| — | 1 0 1 1 1 | — | 0 | 0 | 0 | 1 | 0 | 0 | 0 | 0 |
| — | 1 1 0 0 0 | — | 0 | 0 | 0 | 1 | 0 | 0 | 0 | 0 |
| — | 1 1 0 0 1 | — | 0 | 0 | 0 | 1 | 0 | 0 | 0 | 0 |
| — | 1 1 0 1 0 | — | 0 | 0 | 0 | 1 | 0 | 0 | 0 | 0 |
| — | 1 1 0 1 1 | — | 0 | 0 | 0 | 1 | 0 | 0 | 0 | 0 |
| — | 1 1 1 0 0 | — | 0 | 0 | 0 | 1 | 0 | 0 | 0 | 0 |
| — | 1 1 1 0 1 | — | 0 | 0 | 0 | 1 | 0 | 0 | 0 | 0 |
| — | 1 1 1 1 0 | — | 0 | 0 | 0 | 1 | 0 | 0 | 0 | 0 |
| — | 1 1 1 1 1 | — | 0 | 0 | 0 | 1 | 0 | 0 | 0 | 0 |

In the above tables the columns labeled "ADDRESS" are the 5-bit codes appearing on the five input lines 285 through 289 connected to the ROMs 290 and 291 at the inputs designated respectively as $A_0$ through $A_4$ on the ROMs and corresponding pins 10 through 14 of the ROMs. These addresses are those addresses previously referred to as coming from the counters 280 and 281 and appearing on lines 285 through 289. The column of the ROM truth tables headed "$O_1$" through "$O_8$" is the outputs of the ROMs 290 and 291 respectively appearing on lines 192 through 194, 295, 296 and 235 through 237 respectively. The column entitled "EMIT" correlates the particular emitters 100 through 131 from FIG. 4A with the input address to the ROMs 290 and 291 and the output lines from these ROMs. It is noted that emitters 1 through 16 only are included in these tables since it is only necessary to make a selection of the 16 emitters in either the X or the Y coordinate arrays. The X-Y flip-flop 301 previously referred to determines whether it is the X coordinate array or the Y coordinate array of emitters that will be selected and driven by the output of ROMs 290 and 291 acting through the driver selector logic 30 and emitter drivers 31 previously referred to. Emitters 100 through 115 correspond to the numbers 1 through 16 respectively of the truth table as do emitters 116 through 131 respectively.

The column of the ROM truth table headed "SENSOR" indicates the particular sensors or detectors that will be sensed by the corresponding outputs from the ROMs 290 and 291. The above ROM truth tables thus describe the sequence of activation of the X and Y coordinate arrays of emitters and detectors in order to carry out the particular scan of the display surface affected by the described circuitry.

This particular sequence of the scanning operation will be more fully discussed later but is initially necessary in order that an understanding of the initialization circuitry and its functions may be had.

Referring now more particularly to FIG. 4E, it is seen that as a high signal is applied to line 271 and consequently to AND circuit 274 and upon a clock pulse arriving at the other input of AND circuit 274, a high output is applied to the clock input of flip-flop 278 to clock this flip-flop such that a high voltage appears at its pin 5. The high potential produced at pin 5 and thus on line 279 appears at a number of places in the initialization control logic as may be seen. This high input is applied through OR circuit 471 and over line 472 to pin 13 of a flip-flop 301 to remove the clear from this flip-flop and thus allow the flip-flop to be set and pin 8 to go high. Flip-flop 301 may be designated the X-Y flip-flop since its function is to determine whether it is the X coordinate array or the Y coordinate array of emitters and receivers that will be active during the time that the flip-flop is in the set condition, e.g., its pin 8 is at the high level. The construction of flip-flop 301 may be the same as is the construction of flip-flop 278. The output at pin 8 of flip-flop 301 is taken over line 302 and will, along with the output from flip-flop 301 on line 303, serve to control in part the operation of NAND circuits 184 through 187 previously discussed. The operation of flip-flop 301 is of course such that when output line 302 is at a high level output 303 is at a low level and vice versa. In addition to setting flip-flop 278, the signal appearing on line 271 is also fed to the clear input of flip-flop 304 to remove the low voltage appearing at pin 13 of this flip-flop. The high signal on line 271 is also fed to the clock input of the flip-flop 305 which serves to set the flip-flop 305. When flip-flop 305 is set, the potential of its output pin 6 goes low and that low potential is taken over line 306 to the clock input of flip-flop 307, to prime flip-flop 307. The computer interface logic also supplies a high signal on line 308 to remove the clear on flip-flop 283 such that the next clock pulse appearing at its pin 11 will set this flip-flop such that its pin 9 and thus line 284 go high. The high signals on lines 279 and 284 along with the clock pulses on line 272 are those conditions necessary that counters 280 and 281 in FIG. 4B start counting. Thus as the high signal is applied from line 271 and a high signal from the computer interface logic is applied over line 308 to set flip-flop 283, the counting and scanning operation will begin and scan the display surface with crossed beams of light. The display surface is first scanned by the X emitters and the associated X detectors and then by the Y emitters and associated Y detectors. With the conditions of the circuitry of FIG. 4E just described, when the first blockage of light between an active emitter and any one of its associated detectors occurs a low signal will occur and through the associated operational amplifier will be fed to the multiplexer 226 as previously described. The other input to multiplexer 226 is the output from ROMs 1 and 2 taken over lines 235, 236 and 237 as previously indicated and respectively applied to pins 11, 10 and 9 of multiplexer 226. Multiplexer 226 will emit a signal from its pin 5 upon a dark indication at any of its eight outputs (pins 1 through 4 and 12 through 15) and at the time such a dark indication is in coincidence with the coded signals appearing on input lines 235, 236 and 237 indicating that particular input. This signal emitted from multiplexer 226 at its pin 5 is taken over line 238 to the input of NAND circuit 311. The other input to NAND circuit 311 is taken from the flip-flop 301 over line 302 such that the output of NAND circuit 311 is a low potential which low potential is inverted at inverter 312 to supply a high input to the D terminal of flip-flop 304. Since the clock input to flip-flop 304 is continuously receiving clock pulses, the flip-flop 304 will be set by the next clock pulse that arrives at its pin 11. Setting flip-flop 304 produces a high signal at its pin 8 which is transmitted over line 313 to the clear input of flip-flop 305 to clear this flip-flop and thus cause the output at its pin 6 to return to the high level. The return of pin 6 and connected line 306 to the high level will clock flip-flop 307 since it was previously primed. This causes the output pin 8 of flip-flop 307 to go low which output pin 8 is connected over line 314 to one of the inputs to OR circuit 315. Operation of OR circuit 315 is such that if any one of its inputs is low, its output will be low. Thus the low input over line 314 coming into OR circuit 315 will be transmitted over line 316 to the clear input of flip-flop 278 and terminate the scan initiated by the first signal coming into the flip-flop 278 from line 271 through AND circuit 274. As the flip-flop 278 is cleared or reset the output from its pin 5 on line 279 is taken to provide a clear at pin 13 of flip-flop 307 to thus clear flip-flop 307. Once flip-flop 307 is cleared, its pin 8 will return to the high level and thus remove the low potential from line 314 and thus from one of the inputs to OR circuit 315.

Upon these conditions having occurred, the system is initialized and ready to start scanning for information to be fed to the computer as the information desired from the system. The initialized system is now ready to start scanning at the minimum X values and will scan through the X coordinate arrays and then scan through the Y coordinate arrays. Once that scan is fully complete, the system will stop and will have reported back to the computer 25 the one or more X and Y coordinates through the computer interface system. The X and Y coordinates reported back to the computer are reported one at a time through the interface logic and thus to the computer such that plural dark sensings will be transmitted to the computer to identify the location of the object placed in proximity to the display surface. It is this initialization circuitry operating as just described that insures that the information reported back to the computer will be accurate and complete information concerning the position of an object in proximity to the display surface and not partial information that might otherwise be transmitted to the computer because the object was placed in proximity to the display surface only after part of the initial scan had passed the location and another part of the scan picked up part of the object and gave partial and thus possibly erroneous information to the computer. The erroneous information would be the incomplete information which would in all likelyhood be translated by the computer to indicate a different center point of the object in proximity to the display surface than was the actual case.

In the initialization operation once a dark is detected, the scanning circuitry is immediately reset to its initial position and does not in this initialization operation need to proceed to scan beyond the point where the first dark signal was encountered. In the scanning operation that takes place after initialization, scanning continues after the initial detection of a dark signal and not only is the first dark signal detected in the scan reported but also every dark signal detected in the complete scan of the display surface by both the X and Y coordinate emitters and detectors is reported through the computer interface logic to computer 25.

After initialization, the counters and ROMs will be at the initial zero coordinate address. The count will have been reset or initialized. Referring to the truth tables described above for the ROMs 290 and 291 and to FIG. 4B in particular, it may be seen that when counter 280 has gone through its sixteenth count, a signal is applied from its pin 15 over line 282 to pins 7 and 10 of counter 281 in order to enable counter 281 to pick up the count where counter 280 left off and allows the addresses supplied to ROMs 290 and 291 to go higher and thereby be extended beyond the initial count available in a 4-bit code. This is a standard technique that is used and need not to be elaborated upon further. It may be seen with reference to the truth tables for ROMs 290 and 291 that the output from the ROMs effect a particular sequencing of the X and Y emitters in a coordinated relationship to the X and Y detectors to provide the desired scan. Before describing further the particular scanning operation it should be noted that the signal from pin 5 of flip-flop 278 is also fed over line 321 to NOR circuit 320. The other input to NOR circuit 320 is the high signal applied to line 271 that initiated operation as previously described. The operation of NOR circuit 320 is such that if both inputs are high, a low output is produced to the D input of flip-flop 322. Flip-flop 322 will be clocked by the next clocking pulse appearing on line 273 after the low input is supplied to the D terminal. The clocking pulse will then clock the flip-flop to produce a high signal on pin 6 of flip-flop 322 which pin 6 is connected to line 323. Line 323 is connected to one input of each of the NAND circuits 184 and 186 on FIG. 4A as one of the controls utilized to sequentially select the demultiplexers 180 through 183. This high signal on line 323 will persist until the high signal on line 271 is removed. The high signal on line 271 remains until the computer system is sure that the position of the shadowing device touching the display surface is completely determined and removes the high signal on line 271. While the line 323 carries a high signal, a low signal is of course produced at pin 5 of flip-flop 322 and line 324 carries this low signal to pin 7 of multiplexer 226 to enable multiplexer 226 to accommodate the dark signal appearing on one of the lines 227 through 234.

It should also be noted that when flip-flop 305 was set producing a low signal on its pin 6, this signal not only went to clock flip-flop 307 but also was applied to one of the inputs to OR circuit 330. The other input to OR circuit 330 is from flip-flop 283 over line 284. Line 284 is in the high condition at such times as the counting circuitry on FIG. 4B is in operation. Thus the output of OR circuit 330 is low, except when the counting circuitry is enabled and when the output from pin 6 of flip-flop 305 is high. The low output from OR circuit 330 is applied over line 331 to the clear input of flip-flop 310 to thus inhibit the setting of flip-flop 310 until such time as the low signal appearing on line 331 is removed. A low signal from OR circuit 330 is removed during such time as the counters are enabled by the signal on line 284 and after the initialization has taken place as described above. While the initialization is taking place flip-flop 305 is producing a low signal on its pin 6 and thus inhibiting flip-flop 310. After initialization takes place, flip-flop 305 is reset such that the signal appearing on pin 6 is positive. The signal on the other input to OR circuit 330 is positive during such time as the counting and thus the scanning mechanisms are in operation.

When a dark signal is detected and applied to multiplexer 226 to produce a high signal on line 238, flip-flop 310 will be set in response to the next clock pulse applied to its clock input at pin 3, except when inhibited by a low signal on line 331. When flip-flop 310 is set, a high strobe signal on its pin 6 is taken over line 332 to the computer interface circuitry shown in FIG. 1 and shown in greater detail in FIG. 4C. It is the strobe signal from line 332 in conjunction with the outputs from the ROMs that identify the particular emitter and detector combination that gave rise to the dark signal applied through multiplexer 226. It should also be noted that during the first dark signal emanating from multiplexer 226 on line 238 the flip-flop 304 had the clear signal removed from pin 13 by the signal on line 271 and was set by the next clock pulse on line 276 after the dark indication from line 238 acting through NAND circuit 311 along with the output from flip-flop 301 on line 302 is applied to the D input of flip-flop 304. When set, flip-flop 304 supplies a low—clear signal out on its pin 8 and over line 313 to clear flip-flop 305. After the initialization has taken place, there will be no low to high level transitions appearing on line 271 to clock flip-flop 305 and thus this flip-flop will remain reset for the remainder of the operation. Therefore, in scan after the initialization, the strobe flip-flop 310 will not be inhibited and the flip-flop 307 will not be reset in order to reset the entire system, but rather the system will continue to scan and report through the flip-flop 310 all those dark signals that are detected.

Referring again to FIG. 4A, it will be recalled that the demultiplexers 180 through 183 operate sequentially to supply outputs to the emitter drivers. It is the outputs from the NAND circuits 184 through 187 that control this sequencing of the demultiplexers 180 through 183. Having now looked at the generation of the various signals applied to the inputs of NAND circuits 184 through 187 it may be more readily understood how the NAND circuits 184 through 187 sequence the demultiplexers 180 through 183. As the system is brought into operation, it will be recalled that the flip-flop 301 on FIG. 4E was set to the X condition such that line 302 from its output carries a high potential. It will also be recalled that flip-flop 322 is initially turned on such that its output from pin 6 over line 323 is high. One may observe that from the truth tables and the previously-described operation of the counters and ROMs on FIG. 4B, that the line 295 carrying the output from the ROMs 290 and 291 will initially be in the low output condition. This may be seen by looking at the zero address for ROM 290 and looking across the ROM truth table to the condition of the $O_4$ output which is shown to be a zero indicating a low condition. With the input to NAND circuit 184 and the inverter 340 as just described, it may be observed that all three inputs to NAND circuit 184 are initially high. The operation of NAND circuit 184 is such that when all its inputs are high, a low output will appear on line 188 and be applied to demultiplexer 180. A low input to pins 2 and 14 of any of the multiplexers 180 through 183 will bring that multiplexer into operation so that it will respond to the information carried on lines 192, 193 and 194 and produce a corresponding low output on one of its eight output lines. While demultiplexer 180 is in its operating conditon, it will sequentially produce low outputs on its eight output lines as may be seen from the ROM truth tables. Once that is complete, the inputs to NAND circuits 184 through 187 change such that demultiplexer 181 is next brought into play in the sequence. This comes about by the fact that the X output on line 302 from flip-flop 301 previously discussed on FIG. 4E remains in the high condition and the output from the ROMs 290 and 291 appearing on line 295 will change from low to high after the eighth count from demultiplexer 180. This change may be seen by looking again at the ROM truth table for ROM 290 and noting that as the address input to the ROM changes from 10111 to 11000, the output $O_4$ changes from a zero to a one indicating that this output goes from a low to a high and thus changing the selection demultiplexer 180 to demultiplexer 181. The sequence continues in this fashion such that the next selection made is the demultiplexer 182.

This comes about as may be seen by the fact that the flip-flop 301 changes its condition from X to Y at this point under control of output $O_5$ from the ROMs over line 296. Line 296 acts through NAND circuit 401 to change flip-flop 301 from a high output at its pin 8 to a high output at its pin 9 thus placing a high potential on output line 303. It is observed that line 303 is connected to one of the three inputs to NAND circuit 186 on FIG. 4A and that the other two inputs to NAND circuit 186 are high by the already described operation of the circuitry. Thus demultiplexer 182 will be selected to respond to the outputs of the ROMs on lines 192 through 194 to sequentially step through low potentials emanating from its eight output lines. After the eighth line of demultiplexer 182 has gone through its high state, demultiplexer 183 is brought into operation to sequentially place low potentials on its eight output lines under control again of the outputs from the ROMs on lines 192 through 194. NAND circuit 187 is controlled by the output from flip-flop 301 appearing on line 303 and the output from the ROMs appearing on line 295. It will be noted that this output on line 295 again changes to the high condition as the address input changes from 10111 to 11000. It is thus seen that it is the combination of the outputs from the ROMs 290 and 291 and the condition of flip-flop 301 that bring about the sequential selection of demultiplexers 180 through 183 and thus the sequential selection of the 16 emitters of the X array and next the sequential selection of the 16 emitters of the Y coordinate array of emitters.

It was observed that flip-flop 301 was cleared such that its output on its pin 8 and thus line 302 was high as the output from flip-flop 278 on line 279 through OR circuit 471 was low, before the run signal arrived and caused the flip-flop 278 to go high. This caused flip-flop 301 to be in the X select condition to select the X coordinate arrays for scanning. When flip-flop 305 is set, its output from pin 6 over line 306 is fed to OR circuit 471, which OR circuit 471 produces a low output on line 472 when a low input is applied to either input. Thus until the first dark is seen, flip-flop 301 remains in the X condition and the system repetitively goes through the X scan only. After the first dark signal, the low to OR circuit 471 on line 306 is removed and the system operates as previously described under control of line 279.

The more complete circuitry that effects the setting of the flip-flop 301 to the Y state to cause its output on its pin 9 and thus on line 303 to go to the high state is that circuitry supplying the two inputs to NOR circuit 401. It may be observed that one of the inputs to NOR circuit 401 is the line 296 which has been previously discussed, and from the ROM truth tables it may be seen that it is after the sixteenth X address that line 296 goes from low to high. The other input or NOR circuit 401 is the output from flip-flop 402 which flip-flop 402 had the clear signal removed from its pin 13 as the flip-flop 278 was turned on and high output appeared on line 279. The clock input of flip-flop 402 is from AND circuit 403 which also has one input connected to line 296 and the second input connected to the line 273 through inverter 275 such that clock signals are continually applied to this second input to AND circuit 403. Thus as line 296 goes high, a high signal will be fed to the clock input of flip-flop 402 to set this flip-flop such that its output on pin 8 and line 404 go low. Thus one input, line 404, of gate 401 is low. As soon as the count increases, the line 296 is no longer high but is low. These two lows in this NOR circuit cause the output line 405 to go high and cause the flip-flop 301 to change state and line 303 goes high to carry out the functions previously described.

At the same time that the ROMs in conjunction with the X-Y flip-flop 301 are sequentially selecting the emitters of the X and Y arrays, outputs from ROMs 290 and 291 are also applying an input to the multiplexer 226 of FIG. 4D over lines 235, 236 and 237 to produce the output of multiplexer 226. The operation of multiplexer 226 is such that the outputs from the shared detector receivers appearing on lines 227 through 234 will cause a signal at the output of multiplexer 226 on line 238 as a low or dark signal is applied to a particular one of the inputs (lines 227 through 234) in conjunction with the coded input on lines 235, 236 and 237. The correlation between these signals and the selection performed may be seen from the ROM truth tables. For example, as address 00110 is applied to the ROM 290 by the counters, the emitter 3 is selected along with the detector, or "SENSOR" as the truth table column is labeled, 2-10. This means that the sensors 2 and 10 of both the X and Y coordinate arrays of detectors are selected, and if a dark signal appears, an output will be present on line 238 from multiplexer 226 indicating this fact. This line 238 as previously discussed will set flip-flop 310 if the initialization has already taken place and if the initialization has not taken place, will go through AND circuit 311 to reset the entire scanning mechanism. Prior to initialization flip-flop 310 will not be set. When flip-flop 310 is set its strobe output on line 332 will go to the computer interface logic shown on FIG. 4C and will be one of the inputs to the 8255 device. At the time that a signal appears on line 332, information on lines 235, 236 and 237 is fed to the 8255 device along with the information on lines 192, 193, 194, 195 and 196 from the output of ROMs 291 and 290.

It is thus seen that if a first dark signal appears when address 00110 is applied to ROMs 290 and 291, a strobe will be applied to the 8255 device of FIG. 4C to record the information appearing on lines 192 through 196 and 235 through 237. This information identifies the X coordinate of the first dark signal generated in the complete scan of the display surface. The next step in the operation of the system is that the address applied to ROMs 290 and 291 will change from 00110 to 00111, and it is noted from the ROM truth tables that with this address applied to ROM 290 that emitter number 3 continues to be selected while the sensors 3 and 11 are selected. If a dark signal also appears at this juncture of the scan, this information will be fed through in the same manner as the information just described from sensors 2 and 10 and emitter 3. Prior to the time that the second set of information may be transmitted, the computer will have taken the information from the 8255 device of the computer interface logic and prepared this device to receive this second set of information. After this takes place, the next step in the operation of the system is that the address applied to ROM 290, as may be seen from the ROM truth tables, will change from 00111 to 01000. In this condition, the emitter number 3 again of the X coordinate array of emitters will continue to be selected; however, sensors 4 and 12 are selected. Again, if a dark signal appears indicating a shadow on sensor 4, the information will be sent to the computer interface logic as previously described. If no dark signal appears, no information will be sent to the computer interface logic for transmittal to the computer. As the counters 280 and 281 continue to count and advance as indicated by the "ADDRESS" column on the ROM truth tables, the X scan of the display surface will be completed and immediately thereafter the Y coordinate scan will take place. The Y coordinate scan will be carried out exactly as is the X coordinate scan, the difference being that the flip-flop 301 will change its state as the X coordinate scan is completed and will initiate the Y coordinate scan. The ROMs 290 and 291 will go through the same sequence for the X scans and for the Y scans. The interpretation of the output is changed by the outputs on lines 302 and 303 from flip-flop 301.

It may be observed from the above description that while emitter number 3 is turned on the sensor directly across the display surface from emitter 3 (sensor 3) was sampled along with emitter 3, and, in addition, the sensors on either side of sensor 3 were also looked at while emitter 3 was on. These sensors on either side are 2 and 4. The sequence was that while emitter 3 was on, sensor 2 was initially looked at to determine the presence of an object in the light path between emitter 3 and sensor 2. If a shadow appeared on that sensor indicating the presence of an object, this information was sent to the computer interface logic and on to the computer. The next step is that the light path between emitter 3 and sensor 3 is looked at for the presence of an object blocking the path and information concerning that is supplied to the computer interface logic and on to the computer. Also while emitter 3 is on the light path between emitter 3 and sensor 4 is looked at to determine whether an object appears therein. In this manner three light paths from a single emitter are looked at in sequence and separately recorded to thus give a substantially finer definition than if only a single corresponding emitter and detector 3 are sampled.

It may be seen by review of the ROM truth tables that each emitter that is turned on has the potential of producing three different light paths that may be separately sensed, except for the emitters on the very edge of the display surface. In the case of the emitter on the very edge of the display surface, the sensor on the edge directly opposite is sensed twice. From the above, it may be seen that the ROMs control the sequence of sampling or sensing the information from the arrays of emitters and detectors. The ROM truth tables give a complete description of the sequence of selection of the emitters and detectors when the truth tables are viewed in light of the two conditions of flip-flop 301. It may also be observed that the definition near the edges of the display surface may be improved by increasing the distance of the emitters from the edges of the display surface if such improved definition is desired.

Once the system just described has been initialized and has thereafter gone through a complete scan of the display surface, the system will repeat the scanning until the computer 25 sends a signal to discontinue. The signal to discontinue is in the form of the removal of the high signal on line 271. If an indication of a single point on the display surface is required for the computer 25, computer 25 may, for example, remove the high signal on line 271 after one complete scan of the display surface. If, however, a line is required to be traced out on the display surface, many scans may be required before computer 25 removes the high signal on line 271.

The complete and detailed information fed to the computer through the computer interface logic resulting from an object being placed in proximity to the display surface may be correlated by the computer in any well known way and as desired for the particular purpose a user of the system may have. The apparatus of the present invention supplies more accurate information with the same number of emitters and detectors than available in the prior art and it is not the particular correlation of this information that the present invention is concerned with.

The foregoing detailed description has been given for the purpose of clearness only, and no unnessary limitations should be understood therefrom since modifications will be obvious to those skilled in the art.

What is claimed is:

1. In a scanning system for scanning a display surface with light beams including a plurality of paired light emitting sources and oppositely positioned light detectors adjacent respective opposite edges of a display surface and scan means for sequentially activating said emitting sources and oppositely positioned detectors in predetermined patterns to scan said display surface with light beams emitted by said sources and impinging on said detectors, the improvement comprising:
    means responsive to the first detection by one of said detectors of an interruption of a light beam for generating a first signal; and
    means responsive to said first signal for interrupting said sequential activation of said sources and detectors and for resetting said scan means to an initial condition to thus initialize said system.

2. The scanning system according to claim 1 wherein said scan means operates repetitively until said first signal is generated.

3. The scanning system according to claim 2 wherein said plurality of sources and said plurality of detectors each comprise an X and Y pair of orthogonal arrays.

4. The scanning system according to calim 3 wherein only X or Y array of said X and Y pairs of orthogonal arrays is operated until said first signal is generated.

5. In a scanning system for scanning a display surface with light beams including a plurality of paired light emitting sources and oppositely positioned light detectors adjacent respective opposite edges of a display surface and scan means for sequentially activating said emitting sources and oppositely positioned detectors in predetermined patterns to scan said display surface with light beams emitted by said sources and impinging on said detectors, the improvement comprising:
    means responsive to the first detection by one of said detectors of an interruption of a light beam for generating a first signal;
    means responsive to said first signal for interrupting said sequential activation of said sources and detectors and for resetting said scan means to an initial condition to thus initialize said system; and means responsive to the initializing of said system for initiating a subsequent scan of said display surface.

6. The scanning system according to claim 5 wherein the operation of said scan means continues through subsequent scans of said display surface until terminated under control of a computer.

7. The scanning system according to claim 5 wherein said scan means operates repetitively until said first signal is generated.

8. The scanning system according to claim 6 wherein said plurality of sources and said plurality of detectors each comprise an X and Y pair of orthogonal arrays.

9. The scanning system according to claim 8 wherein only the X or the Y array of said X and Y pairs of orthogonal arrays is operated repetitively until said first signal is generated.

10. The scanning system according to claim 9 wherein said scan means is operable during said subsequent scan to sequentially activate all said sources and detectors in both said X and Y pairs of orthogonal arrays irrespective of the number of interruptions of light detected.

11. In a scanning system for scanning a display surface with light beams including a plurality of paired light emitting sources and oppositely positioned light detectors adjacent respective opposite edges of a display surface and scan means for sequentially activating said emitting sources and oppositely positioned detectors in predetermined patterns to scan said display surface with light beams emitted by said sources and impinging on said detectors, the improvement comprising:

means responsive to the first detection by one of said detectors of an interruption of a light beam for generating a first signal;

means responsive to said first signal for interrupting the operation of said scan means and for resetting said scan means to an initial condition to thus initialize said system;

means responsive to the initializing of said system for initiating a subsequent scan of said display surface;

means responsive during said subsequent scan to detections of interruptions of light beams for generating subsequent signals;

storage means; and means for sequentially transmitting said subsequent signals to said storage means.

12. The scanning system according to claim 11 wherein said scan means operates repetitively until said first signal is generated.

13. The scanning system according to claim 12 wherein said plurality of sources and said plurality of detectors each comprise an X and Y pair of orthogonal arrays.

14. The scanning system according to claim 13 wherein only the X or the Y array of said X and Y pairs of orthogonal arrays is operated repetitively until said first signal is generated.

15. The scanning system according to claim 14 wherein said means for transmitting includes means for blocking the transmission of said first signal.

16. The scanning system according to claim 15 wherein th operation of said scan means is terminated under computer control.

17. The scanning system according to claim 16 wherein said scan means is operable during said subsequent scan to sequentially activate all said sources and detectors in both said X and Y pairs of orthogonal arrays irrespective of the number of interruptions of light detected.

* * * * *